(No Model.) 5 Sheets—Sheet 1.
F. LOMBARD.
DROP HAMMER.
No. 577,531. Patented Feb. 23, 1897.
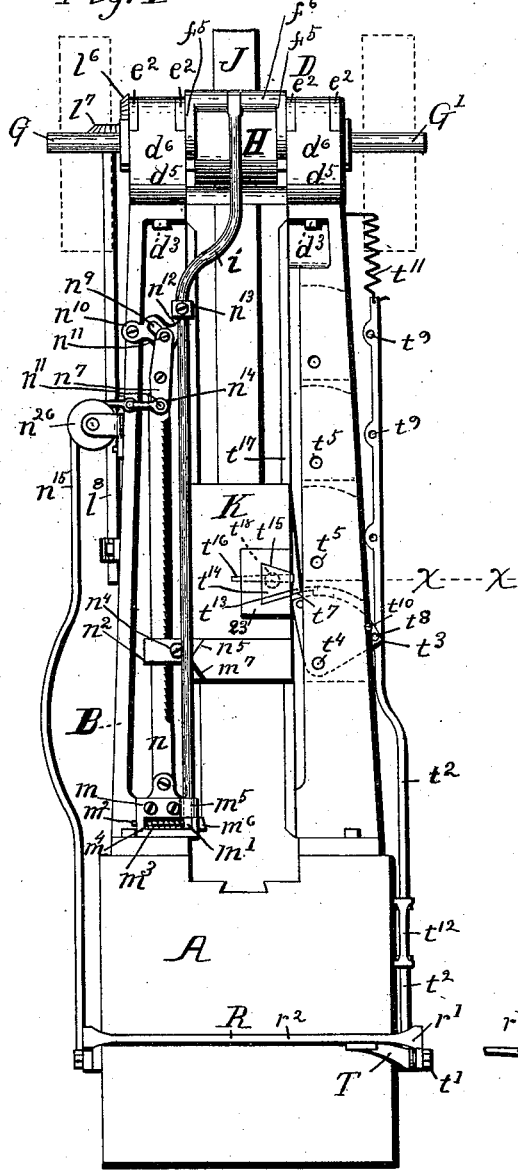
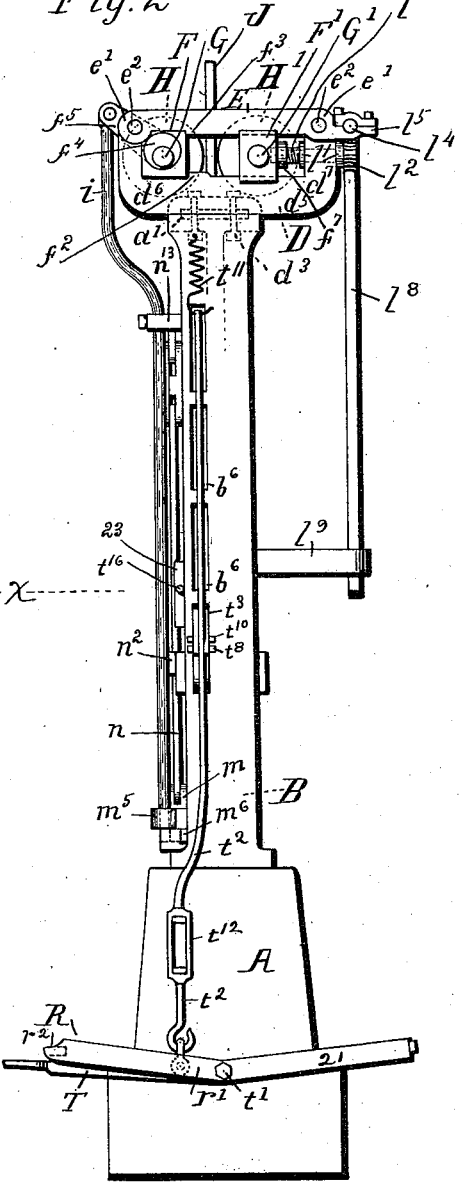
Witnesses.
Henry O'Neill
Willis Barnes
Inventor
Frank Lombard
By George L. Barnes Atty.
THE NORRIS PETERS CO., PHOTO-LITHO., WASHINGTON, D. C.

(No Model.)

F. LOMBARD.
DROP HAMMER.

No. 577,531.

5 Sheets—Sheet 2.

Patented Feb. 23, 1897.

Witnesses
Henry O'Neill
Willis Barnes

Inventor.
Frank Lombard
By George L. Barnes Atty.

(No Model.) 5 Sheets—Sheet 3.
F. LOMBARD.
DROP HAMMER.
No. 577,531. Patented Feb. 23, 1897.
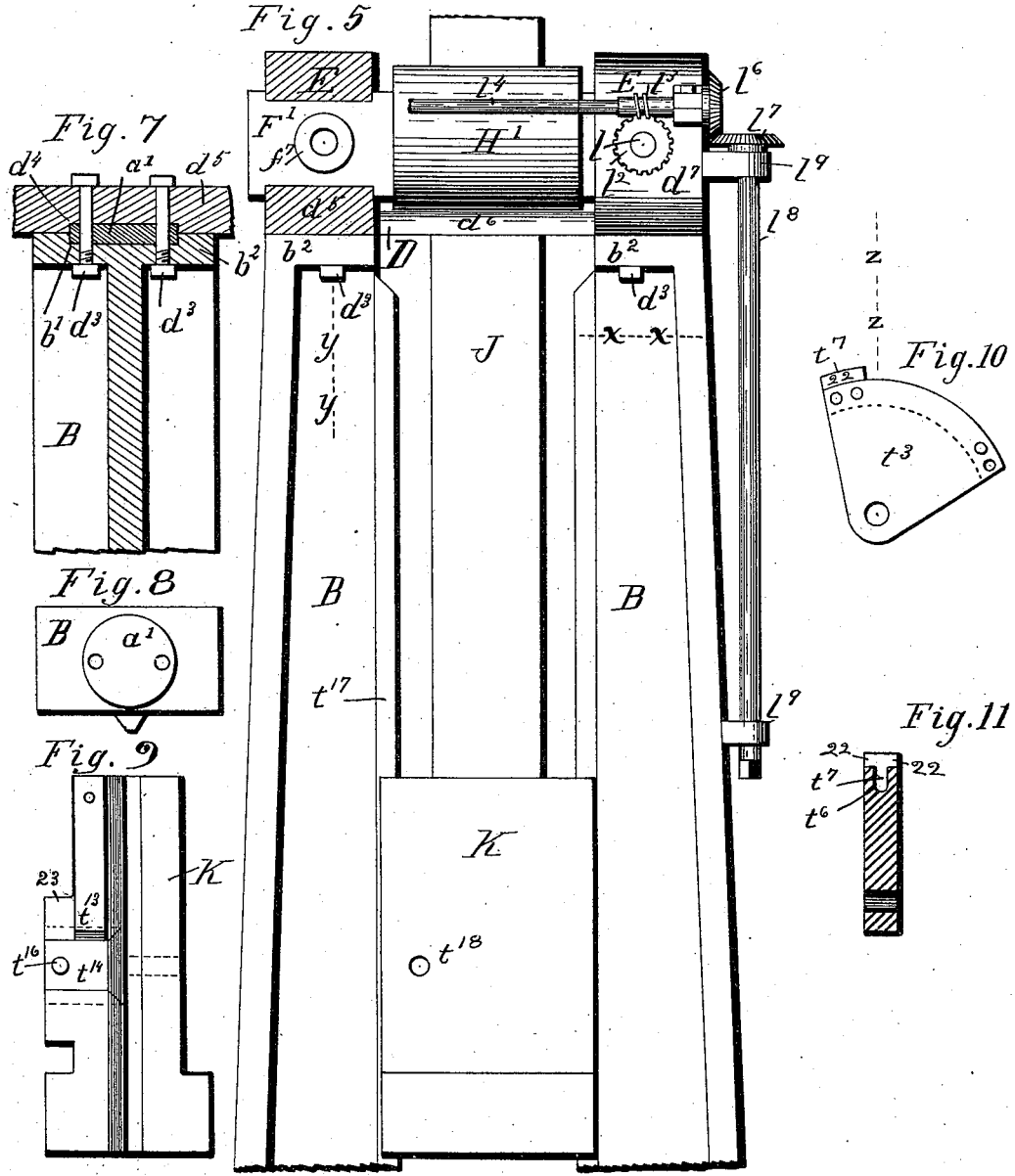
Witnesses
Henry O'Neill
Willis Barnes
Inventor
Frank Lombard
By
George L. Barnes
Atty (No Model.) 5 Sheets—Sheet 4.
F. LOMBARD.
DROP HAMMER.
No. 577,531. Patented Feb. 23, 1897.
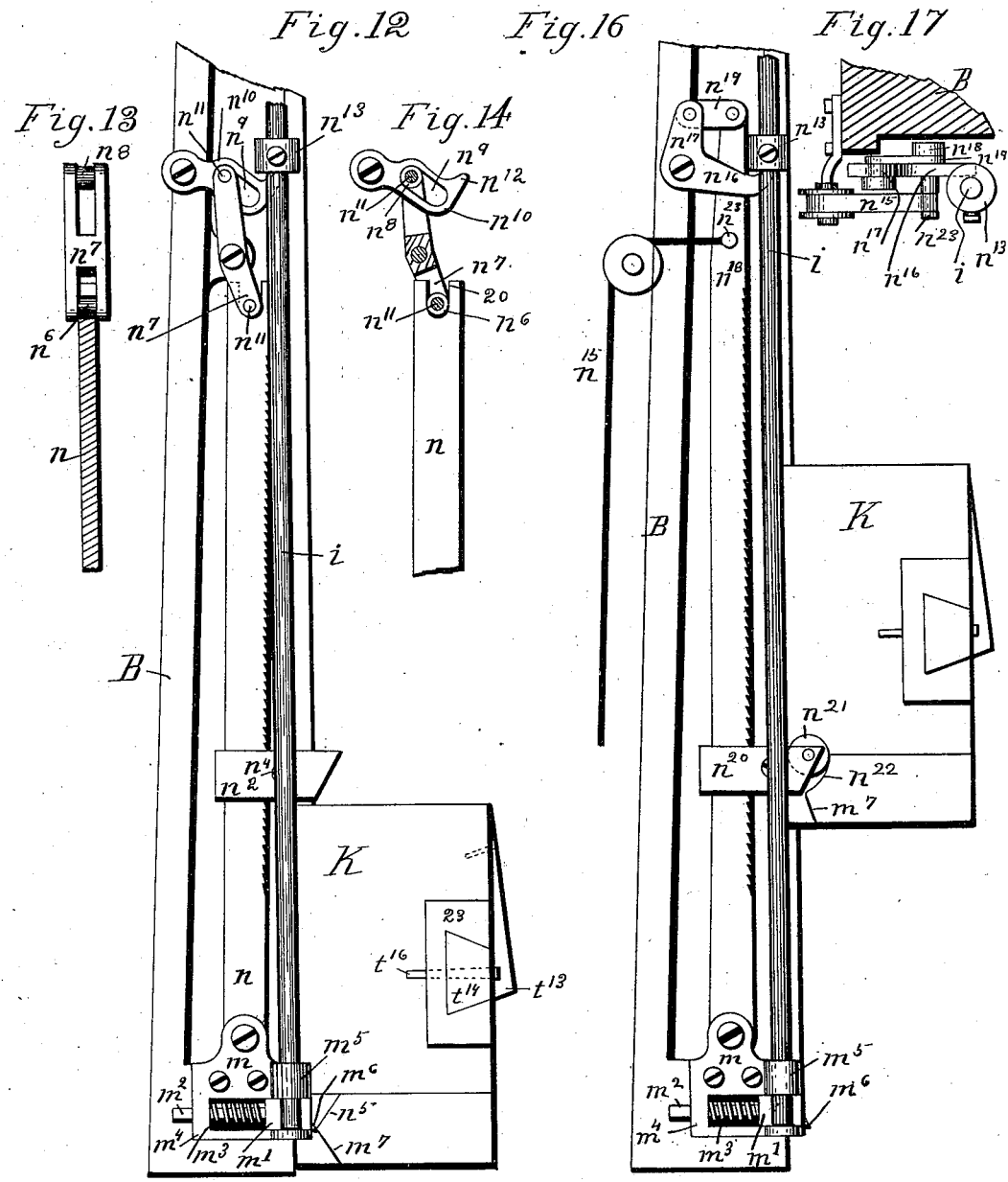
Witnesses
Henry O'Neill
Willis Barnes
Inventor
Frank Lombard
By George L. Barnes
Atty.

(No Model.) 5 Sheets—Sheet 5.

F. LOMBARD.
DROP HAMMER.

No. 577,531. Patented Feb. 23, 1897.

Witnesses
Linus Barnes
Mary Barnes

Inventor
Frank Lombard
By George L. Barnes
Atty.

UNITED STATES PATENT OFFICE.

FRANK LOMBARD, OF HARTFORD, CONNECTICUT.

DROP-HAMMER.

SPECIFICATION forming part of Letters Patent No. 577,531, dated February 23, 1897.

Application filed September 21, 1896. Serial No. 606,472. (No model.)

*To all whom it may concern:*

Be it known that I, FRANK LOMBARD, a citizen of the United States, residing at Hartford, in the town and county of Hartford and State of Connecticut, have invented certain new and useful Improvements in Drop-Hammers, of which the following is a specification.

My invention relates to improvements in drop-hammers, and has for its object to provide improved means for instantaneously rendering the action of the hammer either independent or automatic, improved treadle action and means for operating the friction mechanism, and improved constructive features.

The improvements consist in the novel treadle construction and in the tripping mechanism of the friction-bar or clutching devices.

The invention further consists in the novel holding-pawl or latch for sustaining the hammer in elevated position and also in the construction of the hammer which adapts it for the ready removal of the catch or abutment for engaging the said holding-pawl; and, finally, the invention consists in the parts of the mechanism constructed, arranged, and combined as hereinafter more fully set forth, and particularly recited in the claims.

Figure 3:
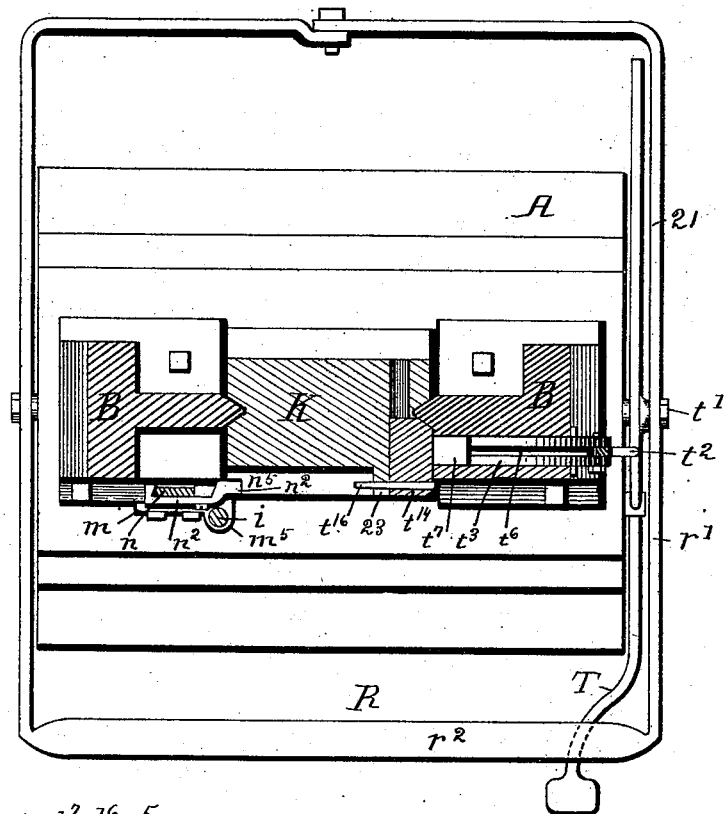
Figure 4:
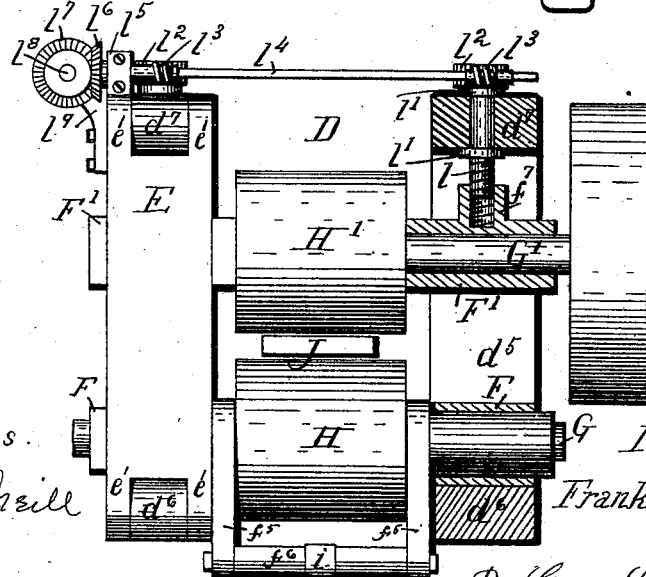
Figure 18:
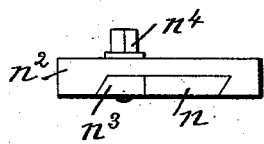
Figure 19:
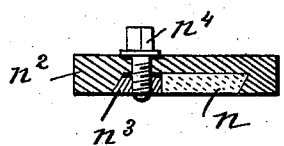
Figure 20:
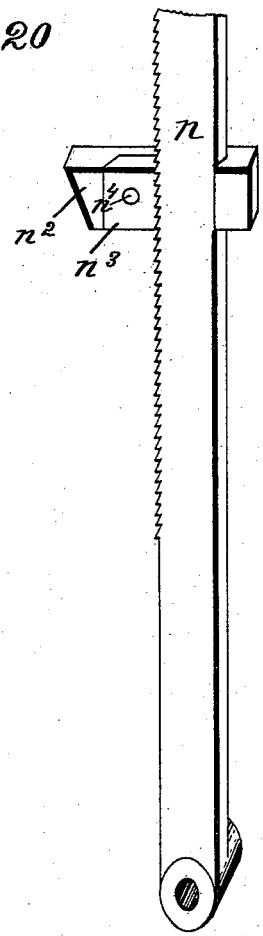

In the accompanying drawings, forming a part of this specification, Figure 1 is a front elevation of a drop-hammer provided with my improvements, and Fig. 2 is a side elevation of the same, the hammer in said figures being shown in elevated position and the friction mechanism unclutched. Fig. 3 is an enlarged horizontal cross-section on the line X X, Figs. 1 and 2. Fig. 4 is an enlarged plan view, partly in section, on the line of the axis of the roll-shafts. Fig. 5 is an enlarged elevation of the upper part of the machine. Fig. 6 is a view of the lower side of a part of the head of the machine with one of the uprights bolted thereto and taken in section on the line X X, Fig. 5. Fig. 7 is a part section on the line *y y*, Fig. 5. Fig. 8 is a plan view of the upper end of an upright. Fig. 9 is a side view of the hammer in Fig. 5. Fig. 10 is a front view of the holding-pawl or hammer-latch. Fig. 11 is a vertical section through said latch on line Z Z, Fig. 10. Fig. 12 is an enlarged front view of the tripping mechanism shown with the trip-rod of the friction mechanism in unclutched position and the hammer down. Fig. 13 is a side view, and Fig. 14 a sectional view, of details of Fig. 12. Fig. 15 is a plan view of the hammer and automatic pawl mechanism shown in Fig. 12. Fig. 16 is a view, similar to Fig. 12, of a modification of the tripping mechanism, the trip-rod being shown in the lower or clutching position and the hammer in the act of being elevated and about to release the tripping mechanism. Fig. 17 is a plan view of the tripping mechanism of Fig. 16. Fig. 18 is a plan view of the lever *n*, dog $n^2$, and clamp-block $n^3$, and Fig. 19 is a horizontal cross-section of the same. Fig. 20 is a perspective view of said parts viewed from the rear side of the machine.

Referring to the drawings, A designates the base of my improved drop-hammer, B the uprights secured to the base in the usual manner, and D the head, frame, or part wherein the friction-rolls H' H are mounted. Said head is fastened to the upright by the usual vertical holding-bolts $d^3$, but to secure alinement and stability against transverse displacement of the parts the uprights are formed with circular depressions *b'* at their upper ends and the head is formed with the corresponding depressions $d^4$, and disks *a'* are fitted in the chambers thus provided, as shown in Figs. 2 and 7, the bolts $d^3$ being passed through the flanges $b^2$ of the uprights and the sides $d^5$ of the head. The sides $d^5$ are provided with upwardly-extending parts $d^6$ $d^7$ at each end, which are perforated transversely, and caps E, having ears *e'*, fitting over the said parts $d^6$ $d^7$ and correspondingly perforated, are secured to the head by the pins $e^2$, inserted through the said perforation, as shown. Between the said caps and the sides $d^5$ of the heads are placed the boxes F F', which support the shafts G G' of the friction-rolls H H'. The boxes F are immovably secured in their seats by abutting against the front parts $d^6$ and suitable shoulders $f^2$ $f^3$ on the head and caps. Said boxes form bearings for hubs $f^4$, which are connected by the rock-arms $f^5$ and cross-yoke $f^6$, to which the trip-rod *i* is attached. Said hubs are provided with bearings eccentric to their peripheries for the shaft G of the friction-roll H, and the oscillation of the hub by the drop or downward travel of the trip-rod is adapted to carry the roll H toward the opposite roll H' to clutch the friction-board J, passing between them and attached to the hammer K, which is arranged to slide between the uprights in the usual manner. The opposite or upward movement of the trip-rod will release the roll from the board and permit the hammer to drop. This action and construction of the movable friction-roll are old, well known, and here require no further description.

The opposite roll H' has its shaft G' journaled in the boxes F', which are fitted to slide in their bearings between the caps and sides $d^5$, but are normally held stationary therein, subject to adjustment for compensation for wear and for the purpose of renewing the friction-board, which improvement constitutes an important feature of my invention. On the rear sides of the boxes are bosses $f^7$, bored and threaded to receive the screw-threaded ends of the adjusting-shafts $l$, which are journaled in the parts $d^7$ and provided with collars $l'$ to prevent endwise motion of the shafts. On the outer ends of the shafts worm-gears $l^2$ are fixed and intermeshed with suitable worm-pinions $l^3$ on a shaft $l^4$, which is journaled in bearings $l^5$ on the rear ends of the caps E. At one end of the shaft $l^4$ a bevel-gear $l^6$ is placed, intermeshing with a bevel-gear $l^7$ on a vertical shaft $l^8$, journaled in bearings $l^9$ on the head and upright. The rotation of shaft $l^8$, by means of a wrench, hand-wheel, or lever applied to its lower end, will, by means of its intervening parts aforesaid, turn the shafts $l$ and thus screw the boxes forward or backward in their seats, both boxes moving equally, and thus always preserving parallelism between the friction-rolls.

The roll-shafts may easily be alined at first or afterward properly reset when worn by removing the shaft $l^4$, and thus when the boxes are correctly set placing the pinions $l^3$ in engagement with the worm-gears $l^2$, the variation of adjustment due to a single tooth of a gear $l^2$ being sufficiently fine for practical purposes. By this mechanism the friction-board may be renewed very quickly at a moment's notice, without the necessity of realining the shafts, and the friction imposed by the rolls against the board may be regulated at pleasure and with the machine in operation.

My improved treadle action and tripping mechanism are shown in Figs. 1 and 2, and the tripping mechanism is shown on an enlarged scale and in detail in Figs. 12 to 17, the two last views of the series representing a modification.

At the base of the upright on the left-hand side is bolted a block $m$, recessed to receive a horizontally-sliding pawl $m'$, having a stem $m^2$, encircled by a spring $m^3$, adapted to press between the pawl and the metal web $m^4$, in which the stem $m^2$ is guided, to throw the pawl inward. The block $m$ is provided with a bearing $m^5$, in which the lower end of the trip-rod $i$ is guided. When the trip-rod is elevated, the pawl is forced under its end by the spring $m^3$, and the inner end $m^6$ of the pawl is thus brought into the path of the beveled part $m^7$ of the hammer, which in falling will throw the pawl back and allow the trip-rod to drop, after which the pawl will remain held back by the trip-rod until the latter is raised in the succeeding operation of releasing the hammer.

To the block $m$ is pivoted a vertical lever $n$, reaching nearly to the head D. The inner edge is serrated and its outer edge beveled to receive a sliding or adjustable dog $n^2$, having a clamp-block $n^3$ fitting the serrated edge and beveled upon its opposite edge, as shown, so as be drawn tightly against the bar by means of its clamping-screw $n^4$, whereby the dog may be secured in any position on the rod corresponding to different elevations of the hammer. The inner end of the dog is beveled, as shown, and projects into the path of the beveled part $n^5$ of the hammer, which is thus adapted, on its upward travel, to engage the dog and swing the lever $n$ outward. The upper end 20 of the lever is slotted to receive a roller $n^6$ on the lower end of a lever $n^7$, pivoted to the upright. The upper end of the lever $n^7$ carries a roller $n^8$, fitted in an inclined cam-slot $n^9$ in a horizontal lever $n^{10}$, pivoted to the edge of the upright, as shown, and having its inner end $n^{12}$ engaging the lower side of a collar $n^{13}$, fastened on the trip-rod. The lever $n^7$ is preferably forked, as shown, to provide ears upon each side of the levers $n$ and $n^{10}$, thus supporting both ends of the pivots $n^{11}$, upon which the rollers are hinged. The outward movement of the upper end of lever $n$ swings the upper end of lever $n^7$ inward and by the camming action of the roller $n^8$ in the inclined slot $n^9$ swings the lever $n^{10}$ upward and lifts the trip-rod $i$ by contact with the collar $n^{13}$ on the rod.

To the projecting ends of the pivot of the roller $n^6$ is linked a shackle $n^{14}$, attached to the end of a strap, cord, or chain $n^{15}$, which is passed over a pulley $n^{26}$, mounted upon the side of the upright and from the pulley extended downward to and connecting with the side arm $r'$ of the main treadle R. The depression of the treadle by means of foot-pressure is thus adapted to impart to the lever $n$ its various connections, and the trip-rod the same movement derived from the hammer action on dog $n^2$. The operation of the hammer may thus be rendered independent or automatic.

In the modification shown in Figs. 16 and 17 the horizontal lever $n^{16}$, corresponding to lever $n^{10}$, is provided with a vertical arm $n^{17}$, which is connected to the lever $n^{18}$, corresponding to lever $n$, by means of a link $n^{19}$, resulting in movement similar to that of the mechanism of Fig. 12. The dog $n^{20}$, corresponding to dog $n^2$, may be provided with a roller $n^{21}$ for engagement with the camming-surface $n^{22}$ of the hammer, which may then be made suitably curved, as shown, with a view to imparting an easy movement to the lever $n^{18}$. In said modification the belt $n^{15}$ is attached to a pin or knob $n^{23}$ on lever $n^{18}$, as shown.

The main treadle R entirely surrounds the base A, having the ends of the bar from which it is formed joined at the rear, as shown in Fig. 3. The side arms $r'$ of the treadle are pivoted to the base substantially at the center thereof, and that portion 21 of the treadle rearward of the pivots is proportioned somewhat longer and heavier than the front portion, so that it is nearly balanced, but adapted to normally stand with its front end elevated. On the right-hand side of the base interior to the side arm of the main treadle is an auxiliary treadle T, pivoted on the same stud $t'$ that supports the main treadle. The auxiliary treadle also reaches rearwardly sufficiently to become practically balanced, but with the rear end slightly preponderating, and its forward end is extended underneath the foot-bar $r^2$ of the main treadle. To the auxiliary treadle a vertical rod $t^2$ is connected, and at its upper end is attached to the holding-pawl or latch $t^3$, the construction of which embodies certain improvements, as hereinafter specified. Said latch is of the form of a sector, pivoted at its center to the upright by a pin $t^4$, passed through any of the horizontal holes $t^5$, provided in the upright for that purpose, the latch being adapted for reception in the corresponding cavities $b^6$, cored in the upright for the purpose of adjusting the latch at different heights to conform to different elevations of the hammer. In the curved edge of the sector a groove $t^6$ is turned, and a hardened block $t^7$ of T-shaped cross-section has its tongue fitted into said groove at the inner end and secured therein by rivets, with the flanges 22 of the T resting on the edge of the sector, as shown in Figs. 1, 2, 3, 10, and 11. Through the opposite end of the groove at the corner of the sector the vertical rod $t^2$ passes, and is pivoted by a pin $t^8$, the rod being provided with a series of holes $t^9$, corresponding to the holes $t^5$ in the upright. A stop-pin $t^{10}$ is also passed through the sector and projecting at each end to limit the throw of the sector by engaging the side of the upright. A spring $t^{11}$ is provided to normally hold the rod $t^2$ lifted, and the rod is provided with a turnbuckle $t^{12}$ to permit the oscillation of the latch when the treadle is elevated without depressing the treadle, the rod in such case slipping vertically in the loop of the turnbuckle. The advantage of the sector-shaped latch is that the part is of great strength and not liable to be fractured, the radius of the sector is such that the strain of the hammer thereon is almost directly downward, and therefore does not tend to force the uprights apart laterally, its position on the upright may be reversed by corresponding reversal of the block and treadle connections and stop-pin $t^{10}$, and the hardened-steel block $t^7$ may be changed ends with when worn at one end and easily replaced by a new block when worn out, thus reducing cost of repairs.

The hammer K travels between the uprights and is provided with the usual hardened shoulder or catch $t^{13}$ for being engaged by the latch $t^3$. The catch is suitably inclined on its outer surface to cam the latch laterally as it passes it while rising. A dovetailed base-block $t^{14}$, integrally formed on the latch, is driven into a corresponding seat $t^{15}$ in the hammer to fasten the catch thereto, and a taper-pin $t^{16}$ driven through the said base-block and the surrounding raised part 23 of the seat $t^{15}$, which prevents the base-block from working out of place. It will be seen that the catch projects laterally past the way or guide $t^{17}$, upon which the hammer slides, and into the plane of the upright, the side face of the hammer and of the base-block of the catch being about coincident with the base of the way, as shown in Figs. 1, 3, and 15. The catch and base-block as ordinarily made are very difficult of removal, as they cannot be reached from the rear side of the machine, and I have therefore improved this feature of drop-hammers by increasing the depth of the base-block in the direction toward the opposite upright, so that it juts past the inner edge of the way $t^{17}$, and forming the hammer with a chamber $t^{18}$ through the hammer in alinement with said inwardly-projecting portion of the base-block, thus adapting it for the introduction of a key or drift from the rear side of the machine to drive the base-block forward and out of its seat to remove the catch, the taper-pin being first driven out of place laterally past the face of the upright.

The operation of the machine is as follows: The hammer being in its elevated position and supported upon the latch $t^3$, as shown in Fig. 1, the trip-rod will have been lifted by the engagement of the beveled part $n^5$ of the hammer with the dog $n^2$ suitably adjusted on the lever $n$, thereby throwing the lever outward and by means of the intermediate lever $n^7$ camming the slotted lever $n^{10}$ upward, upon which the collar $n^{13}$ of the trip-rod rests. The trip-rod will be supported in such elevated position by the pawl $m'$, which will be forced under it by the spring $m^3$, and the friction-rolls will thus remain unclutched from the friction-board J by the action of the eccentric hubs $f^4$ and yoke $f^6$, to which the trip-rod is attached. The depression of the auxiliary treadle T by foot-pressure will carry down the rod $t^2$ and thus swing the latch $t^3$ outward and release the hammer, which will then deliver its blow. As the hammer descends to its lowest position the beveled part $m^7$ of the hammer will engage the end $m^6$ of the pawl and thus force the pawl outward and allow the trip-rod to fall and thus clutch the friction-rolls upon the friction-board to lift the hammer. This cycle of operations will continue as long as the auxiliary treadle is held depressed, the action of the hammer being thus rendered automatic; but if it is desired to deliver independent blows of the hammer then the depression of the main treadle R will carry down the auxiliary treadle and release the hammer, which, having delivered its blow, will not be elevated until the main treadle is allowed to rise and permit the trip-rod to drop. Then the hammer, being raised, will require a subsequent movement of the main treadle to again liberate it, and its cycle of operations will only follow each separate depression of the main treadle, rendering the action independent. Thus the action of the hammer may be rendered either automatic or independent by simply depressing one or the other of the treadles, as required, without stopping the machine or losing a heat of the material which is being worked.

I claim as my invention and desire to secure by Letters Patent—

1. In drop-hammers of the class operated by friction driving-rolls and lifting-board, the combination of a trip-rod adapted by its gravity to actuate the friction-rolls into clutching engagement with the friction-board, a pawl for holding the trip-rod elevated, releasable by engagement of the hammer in falling, a vertical lever pivoted to the side or upright, connections for lifting the trip-rod by movement of said lever, an adjustable dog mounted on said lever and adapted to be engaged and cammed laterally by the hammer in ascending, to lift the trip-rod, a main foot-treadle and connections for operating the lever to lift the trip-rod by depression of the treadle, an auxiliary treadle arranged underneath and in engagement with the main treadle whereby it is adapted for operation with, or independent of the main treadle, a latch for holding the hammer elevated, and a connection between the auxiliary treadle and latch for releasing the hammer, substantially as and for the purpose specified.

2. In drop-hammers of the class operated by friction driving-rolls and lifting-board, the combination of a trip-rod adapted by its gravity to actuate the friction-rolls into clutching engagement with the friction-board, a pawl for holding the trip-rod elevated, means for releasing the trip-rod by the falling movement of the hammer, a vertical lever pivoted at the side of the machine, an adjustable dog mounted on said lever, a cam carried by the hammer adapted to actuate the lever by the ascent of the hammer, a horizontal lever bearing upon a lifting shoulder or collar on the trip-rod, yielding connecting means for operating said horizontal lever by movement of the vertical lever, a main foot-treadle connecting means for operating the vertical lever to lift the trip-rod by depression of the treadle, an auxiliary treadle pivoted underneath and adapted to be engaged by the main treadle on its downward motion, a spring-actuated latch for holding the hammer elevated, and a yielding connection between the auxiliary treadle and latch for releasing the hammer, substantially as and for the purpose specified.

3. In drop-hammers the combination with the friction-rolls, and clutching mechanism of the trip-rod $i$, pawl $m'$, vertical lever $n$ having the adjustable dog $n^2$, the intermediate lever $n^7$, the cam-slotted horizontal lever $n^{10}$, the hammer provided with the cams $m^7$ and $n^5$, the treadle R pivoted substantially in the central plane of the machine, the strap connection from the treadle to lever $n$ and the pulley $n^{26}$, the treadle T pivoted concentric to the main treadle, a spring-actuated latch for holding the hammer elevated, a catch or shoulder, on the hammer for engaging the latch, a connection between the latch and auxiliary treadle, and yielding mechanism embodied in said connection for permitting the yielding of the latch during the passage of the catch, arranged and combined substantially in the manner and for the purpose specified.

4. In a drop-hammer, the combination of the sector-shaped holding-latch, pivoted to the upright at its axial center and having a groove in its curved edge and transverse perforations at its corners extending through the groove, and a hardened T-shaped block fitted into said groove with the lateral branches of the T overlapping and bearing upon the curved edges at either side of the groove, the block being adapted to be secured at either end of the groove and secured by pins passing through the perforations thereof, with the treadle connections pivoted to a pin at the opposite corner of the sector, whereby both the latch and the block are rendered reversible, substantially as and for the purpose specified.

FRANK LOMBARD.

Witnesses:
GEORGE L. BARNES,
WILLIAM L. MAYNARD.